K. PETERSEN.
BELT SHIFTING DEVICE.
APPLICATION FILED JULY 30, 1913.

1,194,873.

Patented Aug. 15, 1916.

INVENTOR:
Kai Petersen
Wm. Wallace White
ATTY.

UNITED STATES PATENT OFFICE.

KAI PETERSEN, OF COPENHAGEN, DENMARK.

BELT-SHIFTING DEVICE.

1,194,873. Specification of Letters Patent. Patented Aug. 15, 1916.

Application filed July 30, 1913. Serial No. 781,938.

*To all whom it may concern:*

Be it known that I, KAI PETERSEN, a subject of the King of Denmark, residing at Copenhagen, in the Kingdom of Denmark, have invented new and useful Improvements in Belt-Shifting Devices, of which the following is a specification.

The present invention refers to an automatic belt-shifting device with a regulating device for variation of the interval of time between the different engagements, without simultaneous variation of the period during which the belt is each time kept in engagement.

One form of construction of my invention is set forth in the accompanying drawings, in which—

Figure 1:
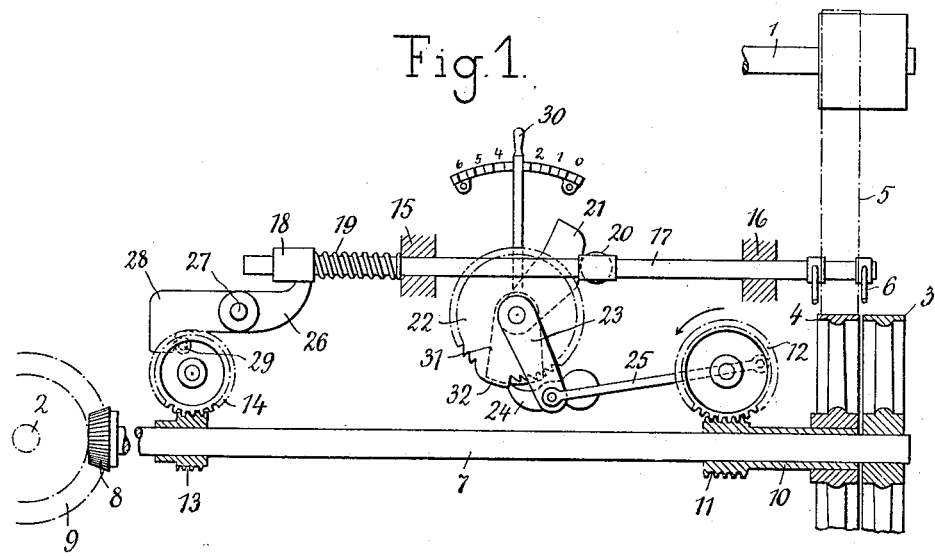
Figure 2:
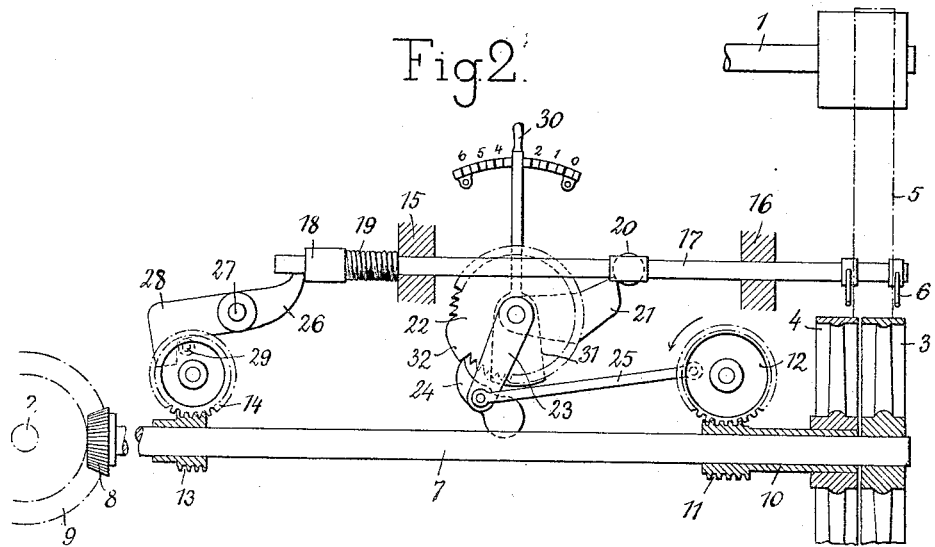

Figure 1 shows the belt-shifting device, with the belt in disengaged position, and Fig. 2 shows the same device with the belt in engaged position.

In the drawings 1 is the main shaft, 2 the working-shaft, 3 the fast pulley, 4 the loose pulley, 5 the belt, 6 the disengaging-fork. The fast pulley 3 is not disposed on the working-shaft 2 itself, but on an intermediate shaft 7, which by means of cog-wheels 8 and 9 meshes with the working-shaft. The loose belt-pulley 4 is fast disposed on a hollow shaft 10, which is disposed on the intermediate shaft 7 and carries a worm 11 which meshes with a worm-wheel 12. On the intermediate shaft 7 there is fast disposed a similar worm 13 which meshes with a worm-wheel 14. When the belt engages the fast pulley, it is not entirely removed from the loose pulley 4 (see Fig. 2), which therefore still continues to rotate, and this is therefore also the case with the worm-wheel 12. The belt-shifter 6 is disposed on a rod 17 sliding in bearings 15 and 16, on which rod there is disposed a spiral spring 19 between the bearing 15 and a cam 18 on the rod 17 itself. On the rod 17, there is furthermore disposed a cam 20 which coöperates with an arm 21 on a cog-pinion 22, which is caused to rotate by means of a constantly working, oscillating ratchet-mechanism, 23, 24, 25, of known construction, the driving-rod of this ratchet-mechanism being driven as connecting-rod by the worm-wheel 12.

At every revolution of the cog-pinion 22, the arm 21 will actuate the cam 20, thereby moving the rod 17, with the shifting-fork 6, as much as is necessary for engagement. This moving of the rod 17 also causes the contraction of the spring 19, and another result will be that one of the arms 26, actuated by a lever 28, turnable around a horizontal pin 27, and influenced by the superweight of the other arm, springs up behind the cam 18, thereby temporarily preventing the shifting-rod from returning. The release of the spring 19 and consequent continuation of disengagement is accomplished by an eccentric pin 29 disposed on the worm-wheel 14. The eccentric pin 29, by actuating the heavy lever-arm 28, lifts it, thereby releasing the other arm 26 from the cam 18. As soon as the release of the spring 19 takes place (which is thus caused by the pin 29), the disengagement immediately takes place, thereby stopping the worm-wheel 14, which is not set in motion again until the moment when engagement again takes place. Thus the working-shaft will, at each engagement, make just as many revolutions, namely a number corresponding to one revolution of the worm-wheel 14.

The interval of time between two pairs of successive engagements is determined by the time required for one revolution of the cog-pinion 22, and this time is, in its turn, determined by the angle over which the ratchet-mechanism at each stroke turns the cog-pinion. This angle, and thereby the time, can be varied by means of a cover-screen 31 turnable around the axle of the pinion and furnished with a handle 30, the edge of which cover-screen 31 is concentric to the pinion and projects slightly outside the upper circle of the teeth. If the cover-screen is placed so that it covers one or more of the teeth passed by the ratchet 24 during its dead-run, the ratchet, which is so wide that it projects out over the cover-screen, will be prevented from meshing with these teeth, and the turning of the cog-pinion at each stroke of the ratchet-mechanism will thereby be reduced in a corresponding degree.

In order that the engagement, which should not take place suddenly like the disengagement, may occur uniformly in all cases, the cog-pinion is furnished with a larger tooth 32, disposed in a suitable place on its periphery, which larger tooth 32 projects outside of the periphery of the cover-screen, the length of said larger tooth corresponding to the full stroke-length of the ratchet-mechanism. Its position is so determined that it is caught by the ratchet immediately after the arm 21 has reached the cam 20.

The regulation of the interval of time between the engagements is accomplished by means of the handle 30, the position of which can be read off on a graduated scale. The graduations of this scale may suitably indicate the number of teeth by which the cog-pinion is turned forward at each stroke. If the handle is placed at zero on the scale, *i. e.*, so that the cover-screen entirely prevents the ratchet from meshing with the teeth, the working-machine is put entirely out of function for the time being, corresponding to an infinite interval of time between engagements.

It is self-evident that the intermediate shaft may be dispensed with, and that the shaft 7 can act as working shaft.

Having now described my invention what I claim as new and desire to secure by Letters Patent is:—

1. An automatic belt-shifting device for constant time of engagement but variable intervals of time between engagements, comprising a shaft, a fixed and a loose pulley on the shaft, a shifting arm, arranged to be constantly driven by the loose pulley, means for actuating loose and fixed pulleys including a rod, adapted to be moved to control the pulley actuating means, a ratchet mechanism associated with the shifting arm and rod for moving the latter to render said fixed pulley operative with predetermined intervals between the starting and stopping thereof, means for holding said rod in the shifted position, means for releasing said last mentioned means, and means for returning said rod to its initial position whereby to render said fixed pulley inoperative.

2. An automatic belt-shifting devive of the class described, comprising a shaft, a pulley fast thereon, a pulley loosely mounted thereon, a belt engageable with said pulleys, said belt being designed to overlap the loose pulley when engaged on the fast pulley whereby to continuously rotate the loose pulley, a rod slidably mounted and having a fork engageable with the belt to cause the belt to be shifted with respect to the pulleys upon the rod being shifted, an arm constantly actuated from the loose pulley, operative connections between the arm and the rod to cause the latter to be shifted at spaced intervals of time, means for varying the interval of time between the shifting of the rod by said last-mentioned means, means normally holding said rod with a belt engaged entirely upon the loose pulley, means for holding said rod in a shifted position against the action of said last-mentioned means, and means for releasing said holding means to permit the automatic return of the rod, as and for the purposes specified.

3. In an automatic belt shifting device for constant time of engagement but variable intervals of time between engagements, a shaft connected with the mechanism to be operated, a pulley fast thereon, a pulley loosely mounted thereon, a belt coöperable with respect to the pulleys, a shifting rod for the belt, a cog-pinion rotatably supported, an arm fixed to turn with said cog-pinion, a worm gear connected with the loose pulley and having crank connection with the arm for actuating the latter, a ratchet mechanism oscillating concentrically with respect to the arm and cog-pinion, a cam on said belt shifting rod and adapted to be actuated by the shifting arm during the rotation thereof, to shift the belt, a device for automatically returning said rod and oppositely shifting the belt, and means to vary the time of return of the rod.

4. In an automatic belt shifting device for constant time of engagement but variable intervals of time between engagements, a shaft connected with the mechanism to be operated, a pulley fast thereon, a pulley loosely mounted thereon, a belt coöperable with respect to the pulleys, a shifting rod for the belt, a cog-pinion rotatably supported, an arm fixed to turn with said cog-pinion, a worm gear connected with the loose pulley and having crank connection with the arm for actuating the latter, a ratchet mechanism oscillating concentrically with respect to the arm and cog-pinion, a cam on said belt shifting rod and adapted to be actuated by the shifting arm during the rotation thereof, to shift the belt, a device for automatically returning said rod and oppositely shifting the belt, and a device for preventing such return until the expiration of a certain time after engagement and for automatic release of the rod after the expiration of said time whereby to stop the rotation of the shaft and to cause the rotation thereof at intermittent intervals of time.

5. In an automatic belt shifting device for constant time of engagement but variable intervals of time between engagements, a shaft driven by belt power from a main shaft and adapted to transmit motion to the mechanism to be operated, a belt shifter coöperable with said belt, for throwing said shaft into and out of operation, a cam engageable with said shifter, means to rotate said cam at varying intervals of time to operate said belt shifter for moving it in one direction so as to throw the shaft in rotation, a return-spring adapted to be actuated during the action of the engaging cam on the belt shifter, a latch adapted to automatically coöperate with the belt shifter against the action of the return-spring, means for causing the belt shifter to be moved by the return-spring and means to vary the time of actuation of the belt shifter by the cam.

6. In an automatic belt shifting device of the class described, the combination with a drive shaft having a belt pulley, a driven shaft and an intermediate shaft geared to the driven shaft and a pulley fast on the intermediate shaft, another pulley loosely mounted thereon, a belt engageable with said pulley, a belt shifting rod slidably mounted, a cam carried by said rod, a ratchet wheel having a smooth peripheral portion, said ratchet wheel being rotatably supported, an arm fixed to said ratchet wheel and adapted to engage the cam of the rod, said rod having engagement with the belt for shifting the latter upon the rod being shifted, a crank disk driven by the loose pulley, said belt being in constant engagement with said loose pulley to continuously drive the same and said crank disk, a counter-weighted pawl pivoted externally of the periphery of the ratchet wheel, a link pivoted at the center of the ratchet wheel and swingingly supporting the pawl, a connecting rod between the pivot of the pawl and the crank disk, said pawl being adapted to engage the ratchet wheel for rotating the same upon the crank disk being actuated, whereby to rotate the arm to cause engagement thereof with the cam of the rod for shifting the latter, and means to vary the time of engagement of the pawl with the ratchet wheel.

7. In an automatic belt shifting device of the class described, the combination with a drive shaft having a belt pulley, a driven shaft and an intermediate shaft geared to the driven shaft and a pulley fast on the intermediate shaft, another pulley loosely mounted thereon, a belt engageable with said pulley, a belt shifting rod slidably mounted, a cam carried by said rod, a ratchet wheel having a smooth peripheral portion, said ratchet wheel being rotatably supported, an arm fixed to said ratchet wheel and adapted to engage the cam of the rod, said rod having engagement with the belt for shifting the latter upon the rod being shifted, a crank disk driven by the loose pulley, said belt being in constant engagement with said loose pulley to continuously drive the same and said crank disk, a counter-weighted pawl pivoted externally of the periphery of the ratchet wheel, a link pivoted at the center of the ratchet wheel and swingingly supporting the pawl, a connecting rod between the pivot of the pawl and the crank disk, said pawl being adapted to engage the ratchet wheel for rotating the same upon the crank disk being actuated, whereby to rotate the arm to cause engagement thereof with the cam of the rod for shifting the latter, a cam-like cover-screen pivoted axially with respect to the ratchet wheel and projecting beyond the periphery thereof, means for turning and holding said cover-screen in position to permit or prevent engagement of the pawl with the ratchet wheel whereby to vary the time intervals between the engagements and rotation of the wheel for shifting the rod, a device for automatically returning the said rod, and a device for preventing such return until the expiration of a certain time after engagement and for automatic release of the engaging rod after the expiration of said time.

8. In an automatic belt shifting device of the class described, the combination with a drive shaft having a belt pulley, a driven shaft and an intermediate shaft geared to the driven shaft and a pulley fast on the intermediate shaft, another pulley loosely mounted thereon, a belt engageable with said pulley, a belt shifting rod slidably mounted, a cam carried by said rod, a ratchet wheel having a smooth peripheral portion, said ratchet wheel being rotatably supported, an arm fixed to said ratchet wheel and adapted to engage the cam of the rod, said rod having engagement with the belt for shifting the latter upon the rod being shifted, a crank disk driven by the loose pulley, said belt being in constant engagement with said loose pulley to continuously drive the same and said crank disk, a counter-weighted pawl pivoted externally of the periphery of the ratchet wheel, a link pivoted at the center of the ratchet wheel and swingingly supporting the pawl, a connecting rod between the pivot of the pawl and the crank disk, said pawl being adapted to engage the ratchet wheel for rotating the same upon the crank disk being actuated, whereby to rotate the arm to cause engagement thereof with the cam of the rod for shifting the latter, a cam-like cover-screen pivoted axially with respect to the ratchet wheel and projecting beyond the periphery thereof, means for turning and holding said cover-screen in position to permit or prevent engagement of the pawl with the ratchet wheel whereby to vary the time intervals between the engagements and rotation of the wheel for shifting the rod, a return spring adapted to be actuated during the action of the engaging rod of the belt shifter, a latch adapted to automatically coöperate with the belt shifter against the action of the return spring, a worm on the intermediate shaft which constitutes the motion transmitting means between the drive and driven shafts, a worm wheel meshing with said worm, and a side pin on the worm wheel and coöperating with the latch to release the belt shifter so as to be moved by the return spring.

In testimony whereof I have signed my name to this specification in the presence of two subscribing witnesses.

KAI PETERSEN.

Witnesses:
CHRISTOFFER MULLER,
I. KNUDSEN.

Copies of this patent may be obtained for five cents each, by addressing the "Commissioner of Patents, Washington, D. C."